United States Patent
Pan et al.

(10) Patent No.: US 9,831,785 B1
(45) Date of Patent: Nov. 28, 2017

(54) STEP-UP/DOWN DIRECT CURRENT CONVERTER

(71) Applicants: ALLIS ELECTRIC CO., LTD., Taipei (TW); Ching-Tsai Pan, Taipei (TW)

(72) Inventors: Ching-Tsai Pan, Taipei (TW); Ming-Chieh Cheng, Taipei (TW); Yen-Shin Lai, Taipei (TW)

(73) Assignees: ALLIS ELECTRIC CO., LTD., Taipei (TW); Ching-Tsai Pan, Taipei (TW)

( * ) Notice: Subject to any disclaimer, the term of this patent is extended or adjusted under 35 U.S.C. 154(b) by 0 days.

(21) Appl. No.: 15/246,328

(22) Filed: Aug. 24, 2016

(51) Int. Cl.
*H02M 3/335* (2006.01)
*H02M 1/14* (2006.01)

(52) U.S. Cl.
CPC ......... *H02M 3/33546* (2013.01); *H02M 1/14* (2013.01)

(58) Field of Classification Search
CPC .. H02M 3/005; H02M 3/335; H02M 3/33507; H02M 3/33523; H02M 3/3353; H02M 3/33538; H02M 3/33546; H02M 3/33561; H02M 3/33584; H02M 3/33592; H02M 3/337
See application file for complete search history.

(56) References Cited

U.S. PATENT DOCUMENTS

| | | | | |
|---|---|---|---|---|
| 5,757,626 A | * | 5/1998 | Jovanovic | H02M 1/4258 363/132 |
| 6,314,002 B1 | * | 11/2001 | Qian | H02M 1/34 363/21.04 |
| 8,027,179 B2 | * | 9/2011 | Hallak | H02M 7/4807 363/127 |
| 2006/0279969 A1 | * | 12/2006 | Leung | H02M 3/33515 363/41 |
| 2013/0063985 A1 | * | 3/2013 | Ye | H02M 1/38 363/21.05 |
| 2014/0056032 A1 | * | 2/2014 | Pan | H02M 3/33569 363/16 |

* cited by examiner

*Primary Examiner* — Emily P Pham
*Assistant Examiner* — Shahzeb K Ahmad
(74) *Attorney, Agent, or Firm* — Chun-Ming Shih; HDLS IPR Services

(57) ABSTRACT

A step-up/down DC converter applied to achieve a characteristic of zero-ripple voltage, which ripple voltage is near zero, is disclosed. The converter includes a ripple-filtering inductor, a power isolating and converting unit, a power switch, a first inductor, a first capacitor, a second capacitor, and a rectifying switch. The power isolating and converting unit comprises windings for isolation an input stage connected to a power source from an output stage connected to a load. The power switch, the first inductor, and the first capacitor are arranged at the input stage, and the second capacitor and the rectifying switch are arranged at the output stage. The ripple-filtering inductor, which may be arranged at the input or output stage, and the first inductor divide the power supplied from the power source, thus the voltage drop of the first inductor is reduced for smoothing the ripple voltage at the output stage.

20 Claims, 10 Drawing Sheets

STEP-UP/DOWN DIRECT CURRENT CONVERTER

BACKGROUND

Technical Field

The present disclosure relates to a power converter. More particularly, the present disclosure relates to a step up/down direct current (DC) converter.

Description of Related Art

As the technology develops, electronic products have become an indispensable means for people in their every-dayness and business as well. In general, the electronic products are operated when providing with a suitable and normal electric power, thereby the electronic products may be suffered when the electric power applies abnormally.

Reference is made to FIG. 1, which is a circuit diagram of a conventional step up/down DC converter. The step up/down DC converter is connected between a power source Vin and the load RL and includes a power switch Q, an inductor L, a diode 2, and an output capacitor Co. The power switch Q is a MOSFET; the drain of the power switch Q is connected to the positive terminal of the power source Vin, the source thereof is connected to the cathode of the diode 2. The step up/down DC converter further includes a body diode connected to the drain and source of the power switch Q. One terminal of the inductor L is connected to the source of the power switch Q and the cathode of the diode 2, and the other terminal of the inductor L is connected to the negative terminal of the power source Vin. One terminal of the output capacitor Co is connected to the anode of the diode 2, and the other terminal of the output capacitor Co is connected to the negative terminal of the power source Vin. The load RL is electrically connected to the output capacitor Co in parallel. The level of the output electric power may be regulated to be higher than or lower than that of the input electric power by modulating the duty cycle of the power switch Q.

The conventional step up/down DC converter constituted by the power switch Q, the inductor L, the diode 2, and the output capacitor Co has advantages of effective cost and simple to make; however, it produces a higher ripple voltage on its output, this may cause errors in load.

SUMMARY

According to one aspect of the present disclosure, a step up/down direct current (DC) converter arranged between a power source and a load and electrically connected to the power source and the load. The step up/down DC converter includes a ripple-filtering inductor, a power isolating and converting unit, a power switch, a first inductor, a first capacitor, a second capacitor, a rectifying switch, and an output capacitor. The power isolating and converting unit is electrically connected to the ripple-filtering inductor and includes a plurality of windings for isolation an output stage electrically connected to the load from an input stage electrically connected to the power source. The power switch is arranged at the input stage and electrically connected to the power isolating and converter unit. The first inductor is arranged at the input stage and electrically connected to the power isolating and converting unit and the power switch. The first capacitor is arranged at the input stage and electrically connected to the power isolating and converting unit and the power switch. The second capacitor is arranged at the output stage and electrically connected to the power isolating unit. The rectifying switch is arranged at the output stage and electrically connected to the power isolating and converting unit and the second capacitor. The output capacitor is arranged at the output stage and electrically connected to the power isolating and converting unit, the second capacitor, the rectifying switch, and the load. The rectifying switch turns off when the power is conducted, thus the ripple-filtering inductor and the first inductor divide the electric power provided by the power source to smooth a ripple voltage conducted to the load. The rectifying switch turns on when the power switch is conducted, thus the ripple-filtering inductor and the first capacitor divide the electric power provided by the power source to smooth the ripple voltage conducted to the load.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
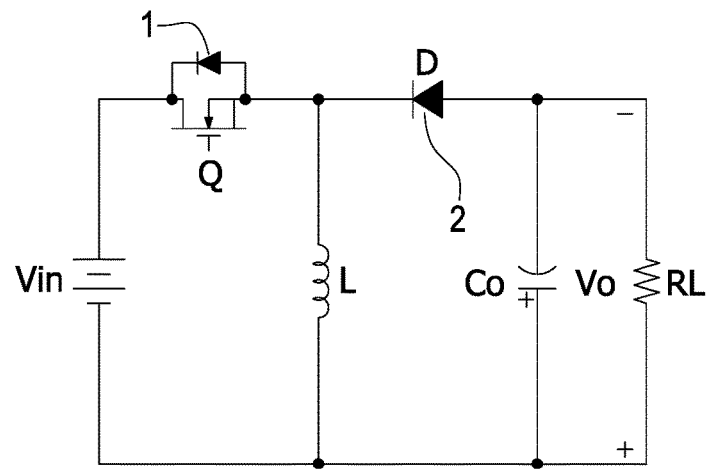
FIG. 1 is a circuit diagram of a conventional step up/down DC converter.
Figure 2:
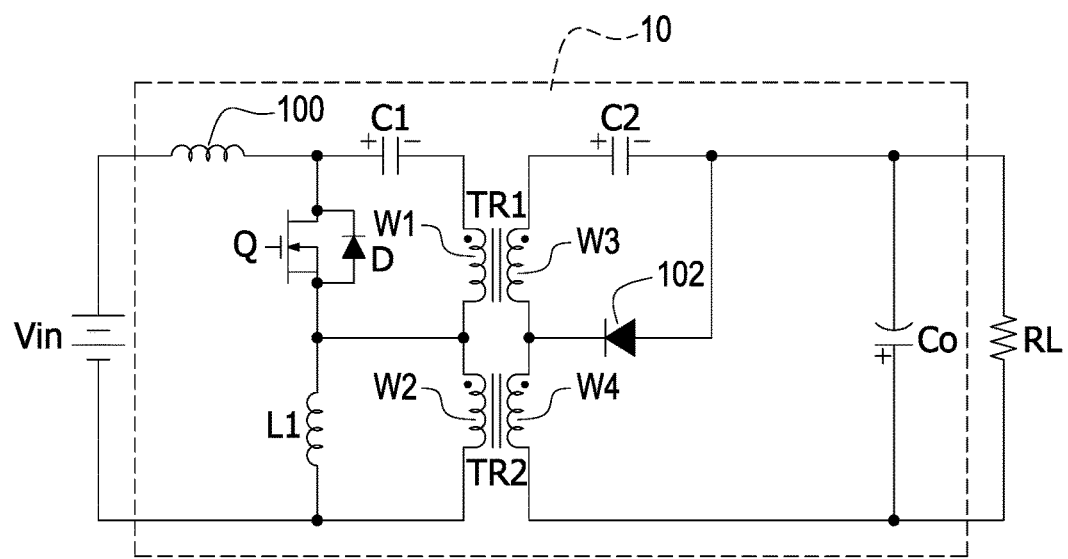
FIG. 2 is a circuit diagram of a step up/down DC converter according to a 1st embodiment of the present disclosure.

Reference is made to FIG. 2, which is a circuit diagram of a step up/down DC converter according to a 1st embodiment of the present disclosure. In FIG. 2, the step up/down DC converter 10 is arranged between a power source Vin and a load RL and electrically connected thereto for regulating an electric power supplied from the power source Vin to the load RL. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The step up/down DC converter 10 further includes an input stage electrically connected to the power source Vin and an output stage electrically connected to the load RL. The power isolating and converting unit includes a plurality of windings. For example, the power isolating and converting unit shown in FIG. 2 includes a first winding W1, a second winding W2, a third winding W3, and a fourth winding W4. The first winding W1 and the second winding W2 are arranged at the input stage and electrically connected in series, and the third winding W3 and the fourth winding W4 are arranged at the output stage and electrically connected in series. The first winding W1 is magnetically coupled with the third winding W3, thus a first transformer TR1 is constituted; the second winding W2 is magnetically coupled with the fourth winding W4, thus a second transformer TR2 is constituted.

The ripple-filtering inductor 100, the power switch Q, the first capacitor C1, and the first inductor L1 are arranged at the input stage. The power switch Q is, for example, a metal-oxide-semiconductor field-effect transistor (MOSFET). One terminal of the ripple-filtering inductor 100 is connected to the positive terminal of the power source Vin, and the other terminal of the ripple-filtering inductor 100 is connected to the drain of the power switch Q and one terminal of the first capacitor C1; the other terminal of the first capacitor C1 is connected to the first winding W1 where the second winding W2 is not connected.

The source of the power switch Q is connected to a node between the first winding W1 and the second winding W2, and the gate thereof is connected to a controller (not shown) for receiving signals generates by the controller; the controller is configured to generate the signals to turn on/off the power switch Q. The step up/down DC converter 10 may further includes a diode D electrically connected to the power switch Q. Specifically, the cathode of the diode D is connected to the drain of the power switch Q, and the anode thereof is connected to the source of the power switch Q; the diode D is, for example, the body diode of the power switch Q. One terminal of the first inductor L1 is connected to the source of the power switch and the second winding W2 wherein the first winding W1 is not connected, and the other terminal of the first inductor L1 is connected to the negative terminal of the power source Vin and the second winding W2 where the first winding W1 is not connected. Besides, the second winding W2 where the first winding W1 is not connected is connected to the negative terminal of the power source Vin.

The second capacitor C2, the rectifying switch 102, and the output capacitor Co are arranged at the output stage. The output capacitor Co is electrically connected to the load RL in parallel. One terminal of the second capacitor C2 is connected to the third winding W3 wherein the fourth winding W4 is not connected, and the other terminal of the second capacitor C2 is connected to the output capacitor Co and the load RL. The rectifying switch 102 is, for example, a diode; the cathode of the rectifying switch 102 is connected to the third winding W3 where the fourth winding W4 is connected, and the anode thereof is connected to the second capacitor C2, the output capacitor Co, and the load RL.

Figure 5:
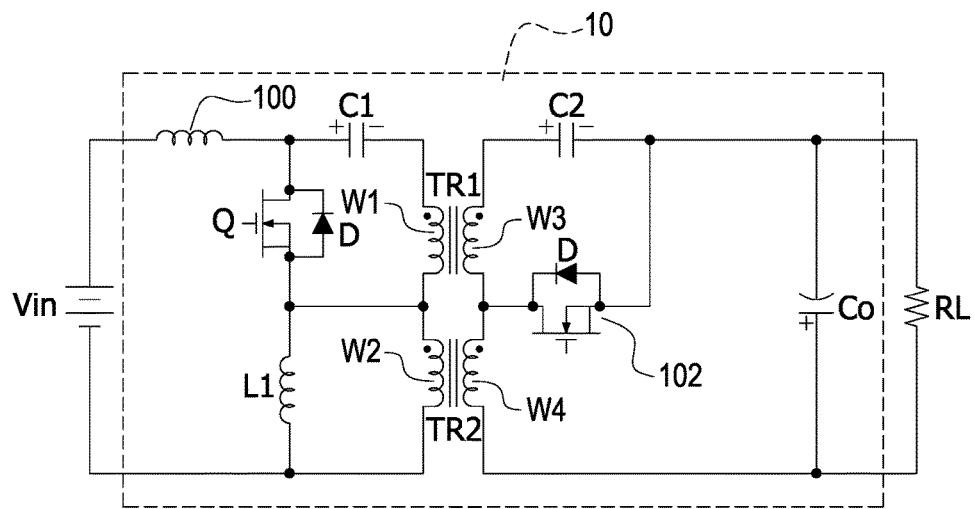
FIG. 5 is a circuit diagram of a step up/down DC converter according to a 2nd embodiment of the present disclosure.

The step-down DC converter shown in FIG. 2 employs diodes for the rectification. Obviously, the positive conducting voltage-drop of the diodes becomes a main reason to restrict the increase of the efficiency. To solve the aforementioned problem, a general solution is to replace the diodes by MOSFETs for the rectification (as can be seen in FIG. 5). While the implementation of the step up/down DC converter 10 employs MOSFETs for the rectification is both complex and expensive, advantageously, the conduction loss can be reduced since the MOSFETs have advantages of low input resistance, short response time, and high input resistance.

In FIG. 5, the rectifying switch 102 is an N-type MOSFET; the drain of the rectifying switch 102 is connected to a node between the third winding W3 and the fourth winding W4, the source thereof is connected to the second capacitor C2 and the output capacitor Co, and the gate thereof is connected to a controller (not shown) for receiving signals generates by the controller; the controller is configured to generate the signals to turn on/off the rectifying switch 102. The step up/down DC converter 10 may still further includes a diode D electrically connected to the rectifying switch 102. Specifically, the cathode of the diode D is connected to the drain of the rectifying switch 102, and the anode thereof is connected to the source of the rectifying switch 102; the diode D is, for example, the body diode of the rectifying switch 102. It should be noted that the step up/down DC converter 10 shown in the FIG. 5 can achieve the functions as the step up/down DC converter 10 shown in FIG. 2 mentioned above does.

Figure 3:
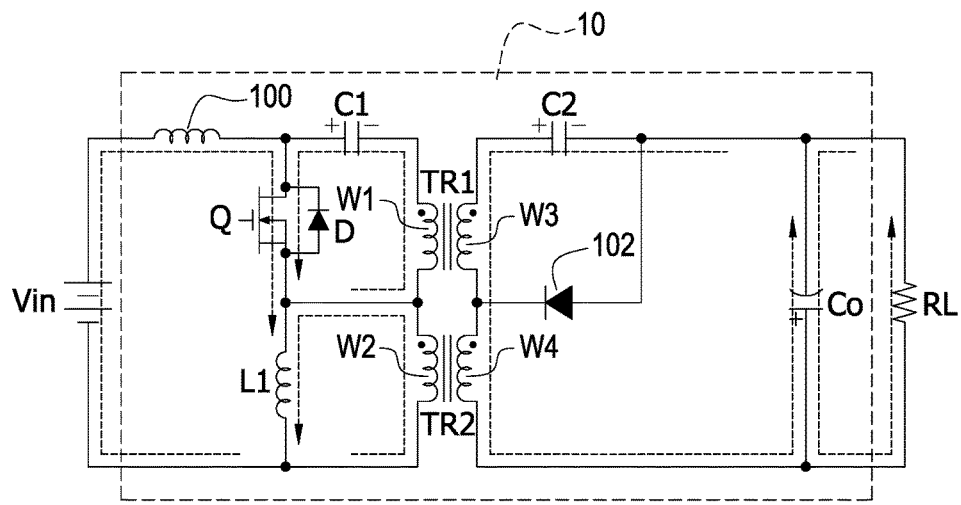
FIG. 3 is an equivalent diagram of the step up/down DC converter under a first operation mode according to the 1st embodiment of the present disclosure.

Reference is made to FIG. 3, which is an equivalent diagram of the step up/down DC converter under a first operation mode according to the 1st embodiment of the present disclosure. When the step up/down DC converter 10 is under a first operation mode, the power switch Q is conducted and the rectifying switch 102 turns off, this gives the electric power supplied from the power source Vin to be divided into three power flow paths at the input stage. One of the power flow paths is established in the power source Vin, the ripple-filtering inductor 100, the power switch Q, and the first inductor L1, another power flow path is established in the first winding W1, the power switch Q, and the first capacitor C1, and the other power flow path is established in the second winding W2 and the first inductor L1. Therefore, the electric power supplied from the power source Vin is conducted to the first winding W1 and the second winding W2, and can be magnetically coupled to the third winding W3 and the fourth winding W4.

The electric power magnetically coupled to the output stage establishes single power flow path in the second capacitor C2, the third winding W3, the fourth winding W4, and the output capacitor Co. The output capacitor Co provides electric power to the load RL.

In short, when the power switch Q is conducted, the ripple-filtering inductor 100 and the first inductor L1 divide the electric power supplied from the power source Vin, thus the voltage drop of the first inductor L1 is reduced for smoothing the ripple voltage at the output stage and provided to the load RL.

Figure 4:
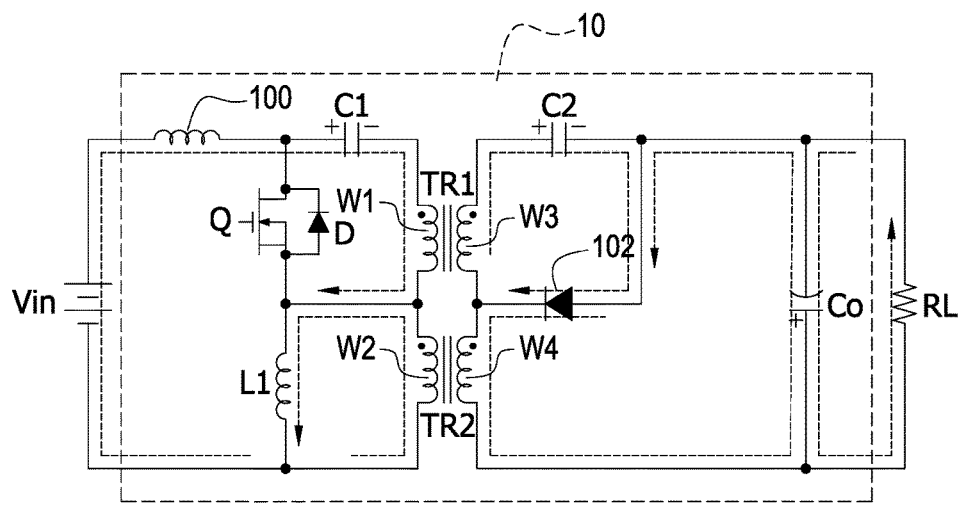
FIG. 4 is an equivalent diagram of the step up/down DC converter under a second operation mode according to the 1st embodiment of the present disclosure.

Reference is made to FIG. 4, which is an equivalent diagram of the step up/down DC converter under a second operation mode according to the 1st embodiment of the present disclosure. When the step up/down DC converter 10 is under a second operation mode, the power switch Q is not conducted and the rectifying switch 102 turns on, this gives the electric power supplied from the power source Vin to be divided into two power flow paths at the input stage. One of the power flow paths is established in the power source Vin, the ripple-filtering inductor 100, the first capacitor C1, the first winding W1, and the first inductor L1, and the other power flow path is established in the second winding W2 and the first inductor L1. Therefore, the electric power supplied from the power source Vin is conducted to the first winding W1 and the second winding W2, and can be magnetically coupled to the third winding W3 and the fourth winding W4.

The electric power coupled to the output stage is also divided into two power flow paths. One of the power flow paths is established in the third winding W3, the second capacitor C2, and the rectifying switch 102, and the other power flow path is established in the rectifying switch 102, the fourth winding W4, and the output capacitor Co. The output capacitor Co provides electric power to the load RL.

In short, when the power switch Q is not conducted, the ripple-filtering inductor 100 and the first inductor L1 divide the electric power supplied from the power source Vin, thus the voltage drop of the first inductor L1 is reduced for smoothing the ripple voltage at the output stage and provided to the load RL.

Figure 6:
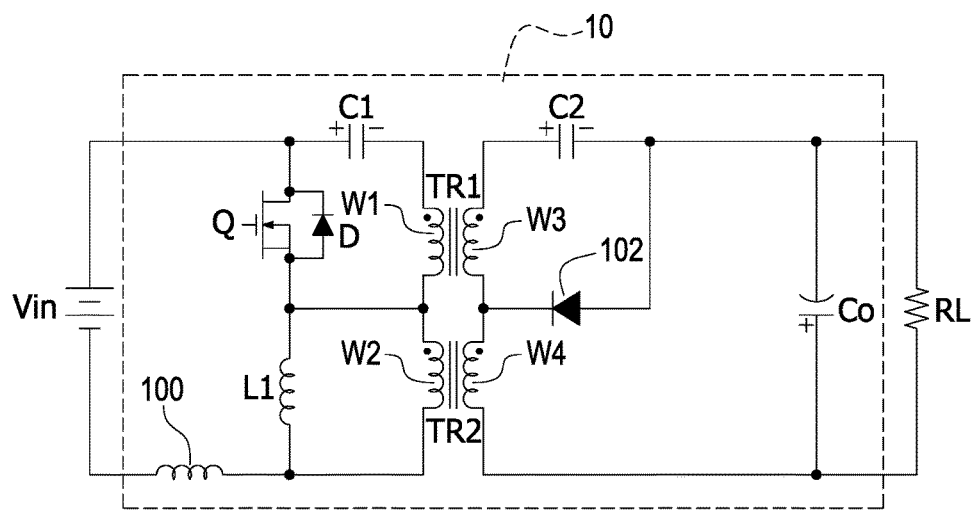
FIG. 6 is a circuit diagram of a step up/down DC converter according to a 3rd embodiment of the present disclosure.

Reference is made to FIG. 6, which is a circuit diagram of a step up/down DC converter according to a 3rd embodiment of the present disclosure. In FIG. 6, the step up/down DC converter 10 is arranged between a power source Vin and a load RL and electrically connected thereto. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The step up/down DC converter 10 further includes an input stage electrically connected to the power source Vin and an output stage electrically connected to the load RL. The power isolating and converting unit includes a plurality of windings. For example, the power isolating and converting unit shown in FIG. 6 includes a first winding W1, a second winding W2, a third winding W3, and a fourth winding W4. The first winding W1 and the second winding W2 are arranged at the input stage and electrically connected in series, and the third winding W3 and the fourth winding W4 are arranged at the output stage and electrically connected in series. The first winding W1 is magnetically coupled with the third winding W3, thus a first transformer TR1 is constituted; the second winding W2 is magnetically coupled with the fourth winding W4, thus a second transformer TR2 is constituted.

The ripple-filtering inductor 100, the power switch Q, the first capacitor C1, and the first inductor L1 are arranged at the input stage. The power switch Q is, for example, a MOSFET. The drain of the power switch Q is connected to the positive terminal of the power source Vin, the source thereof is connected to a node between the first winding W1 and the second winding W2, and the gate thereof is connected to a controller (not shown) for receiving signals generates by the controller; the controller is configured to generate the signals to turn on/off the power switch Q.

One terminal of the first capacitor C1 is connected to the positive terminal of the power source Vin and the drain of the power switch Q, and the other terminal of the first capacitor C1 is connected to the first winding W1 where the second winding W2 is not connected. One terminal of the first inductor L1 is connected to the source of the power switch Q and the node between the first winding W1 and the second winding W2, and the other terminal of the first inductor L1 is connected to the second winding W2 where the first winding W1 is not connected. One terminal of the ripple-filtering inductor 100 is connected to the negative terminal of the power source Vin, and the other terminal of the ripple-filtering inductor 100 is connected to the first inductor L1 where the power switch Q is not connected and the second winding W2 where the first winding W1 is not connected.

The output stage of the step up/down DC converter 10 shown in FIG. 6 is the same as that of shown in FIG. 2 mentioned above and are not repeated here for brevity, and the step up/down DC converter 10 shown in the FIG. 6 can achieve the functions as the step up/down DC converter 10 shown in the FIG. 2 mentioned above does.

Figure 7:
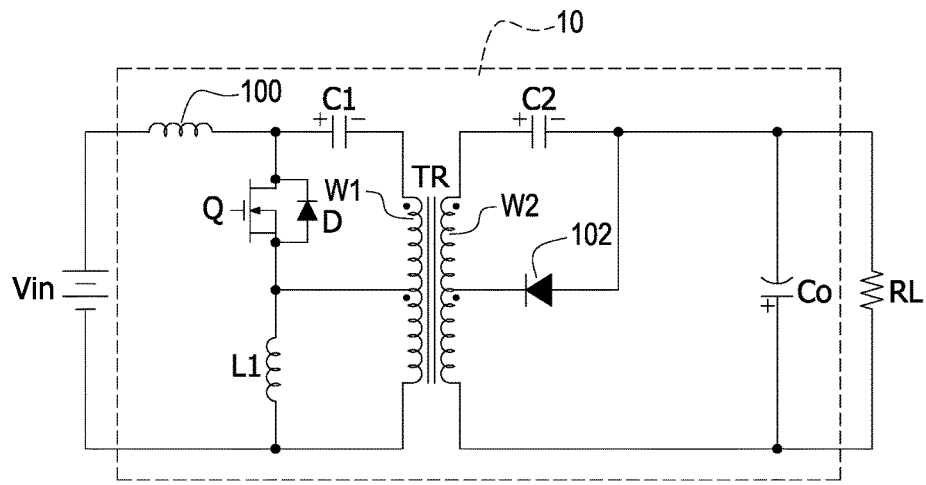
FIG. 7 is a circuit diagram of a step up/down DC converter according to a 4th embodiment of the present disclosure.

Reference is made to FIG. 7, which is a circuit diagram of a step up/down DC converter according to a 4th embodiment of the present disclosure. In FIG. 7, the step up/down DC converter 10 is arranged between a power source Vin and a load RL and electrically connected thereto for regulating an electric power supplied from the power source Vin to the load RL. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The power isolating and converting unit includes a plurality of windings. For example, the power isolating and converting unit shown in FIG. 7 includes a first winding W1 and a second winding W2; the first winding W1 is arranged at an input stage of the step up/down DC converter 10 and electrically connected to the power source Vin, and the second winding W2 is arranged at an output stage of the step up/down DC converter 10 and electrically connected to the load RL. In addition, the first winding W1 is magnetically coupled with the second winding W2, thus a center-tapped transformer TR is constituted. While the production method of the center-tapped transformer TR is complex, it is tight, thus the volume of the step-down DC converter 10 is reduced.

The ripple-filtering inductor 100, the power switch Q, the first capacitor C1, and the first inductor L1 are arranged at the input stage. The power switch Q is, for example, a MOSFET. The upper tap of the first winding W1 is connected to the first capacitor C1, the lower tap of the first winding W1 is connected to the negative terminal of the power source Vin, and the center tap of the first winding W1 is connected to the source of the power switch Q.

The drain of the power switch Q is connected to the terminal of the first capacitor C1 where the first winding W1 is not connected, and the gate thereof is connected to a controller (not shown) for receiving signals generates by the controller; the controller is configured to generate the signals to turn on/off the power switch Q. One terminal of the ripple-filtering inductor 100 is connected to the positive terminal of the power source Vin, and the other terminal of the ripple-filtering inductor 100 is connected to the drain of the power switch Q. One terminal of the first inductor L1 is connected to the center tap of the first winding W1, and the other terminal of the first inductor L1 is connected to the lower tap of the first winding W1 and the negative terminal of the power source Vin.

The second capacitor C2, the rectifying switch 102, and the output capacitor Co are arranged at the output terminal. The output capacitor Co is electrically connected to the load RL in parallel. One terminal of the second capacitor C2 is connected to the upper tap of the second winding W2, and the other terminal of the second capacitor C2 is connected to the output capacitor Co and the load RL. The rectifying switch 102 is, for example, a diode; the cathode of the rectifying switch 102 is connected to the center tap of the second winding W2, and the anode thereof is connected to the second capacitor C2 where the second winding W2 is not connected, the output capacitor Co, and the load RL. The lower tap of the second winding W2 is connected to the output capacitor Co and the load RL where the second capacitor C2 and the rectifying switch 102 are not connected. The step up/down DC converter 10 shown in the FIG. 7 can achieve the functions as the step up/down DC converter 10 shown in FIG. 2 mentioned above does and is not repeated here for brevity.

Figure 8:
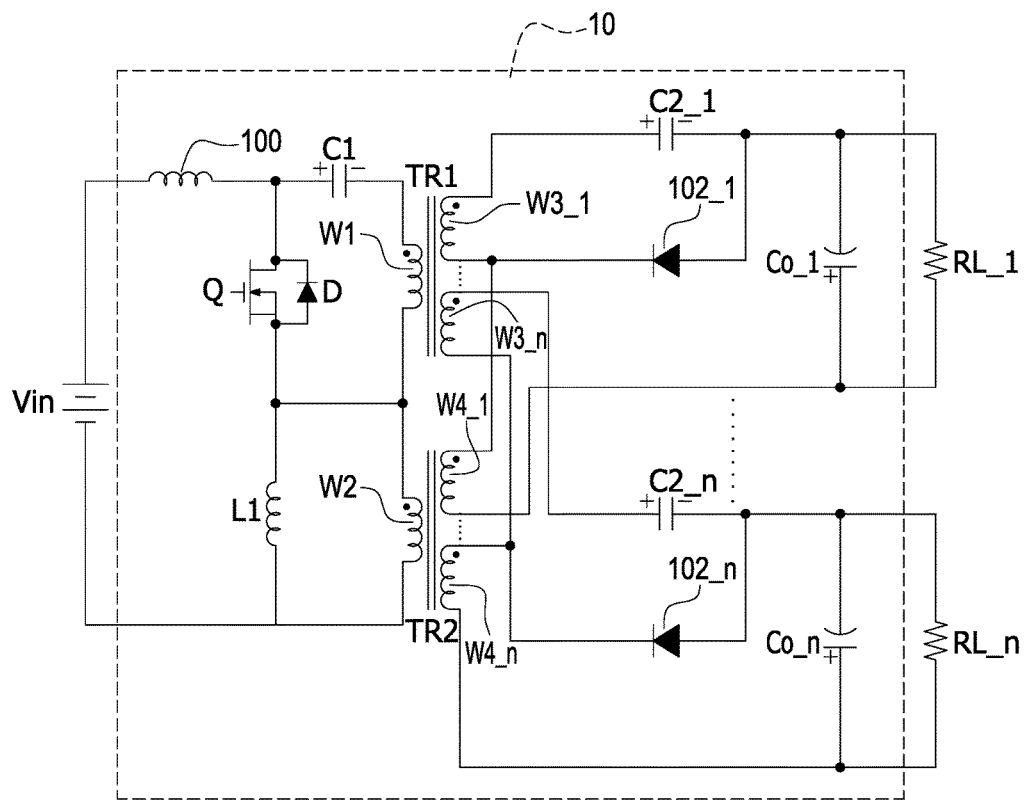
FIG. 8 is a circuit diagram of a step up/down DC converter according to a 5th embodiment of the present disclosure.

Reference is made to FIG. 8, which is a 5th embodiment of a step up/down DC converter according to the present disclosure. The input stage of the step up/down DC converter 10 shown in FIG. 8 is the same as that of shown in FIG. 2 mentioned above, and the same reference numbers are used in the drawings and the description to refer to the same parts. It should be noted that the scheme for the output stage of the step up/down DC converter 10 shown in FIG. 8 is constituted by a plurality of circuitries of output stages shown in FIG. 2 mentioned above, and the step up/down DC converter 10 shown in FIG. 8 is configured to regulate an electric power supplied from a power source Vin to a plurality of loads RL_1~RL_n.

In FIG. 8, the step up/down DC converter 10 is arranged between the power source Vin and the loads RL_1~RL_n and electrically connected thereto. The step up/down DC converter 10 includes a power isolating and converting unit (its reference numeral is omitted), a ripple-filtering inductor 100, a power switch Q, a first inductors L1, a first capacitor C1, a plurality of second capacitors C2_1~C2_n, a plurality of rectifying switches $102_{13}$ 1~102_n, and a plurality of output capacitors Co_1~Co_n.

The step up/down DC converter 10 further includes an input stage electrically connected to the power source Vin and an output stage electrically connected to the load RL_1~RL_n. The power isolating and converting unit includes a plurality of windings. In FIG. 8, windings W1 and W2 electrically connected in series are arranged at the input stage, and windings W3_1~W3_n and W4_1~W4_n are arranged at the output stage. Each of the windings W3_1~W3_n is electrically connected to one of the windings W4_1~W4_n in series. For example, the windings W3_1 and W4_1 are electrically connected in series, and the windings W3_n and W4_n are electrically connected in series. The winding W1 is magnetically coupled with the windings W3_1~W3_n, thus a first transformer TR1 is constituted; the winding W2 is magnetically coupled with the windings W4_1~W4_n, thus a second transformer TR2 is constituted.

The ripple-filtering inductor 100, the power switch Q, the first capacitor C1, and the first inductor L1 are arranged at the input stage. The power switch Q is, for example, a MOSFET. One terminal of the ripple-filtering inductor 100 is connected to the positive terminal of the power source Vin, and the other terminal of the ripple-filtering inductor 100 is connected to the drain of the power switch Q. One terminal of the first capacitor C1 is connected to the winding W1 where the winding W2 is not connected, and the other terminal of the first capacitor C1 is connected to the drain of the power switch Q.

The source of the power switch Q is connected to a node between the winding W1 and W2, and the gate thereof is connected to a controller (not shown) for receiving signals generates by the controller; the controller is configured to generate the signals to turn on/off the power switch Q. One terminal of the first inductor L1 is connected to the source of the power switch Q, and the other terminal of the first inductor L1 is connected to the winding W2 where the winding W1 is not connected and the negative terminal of the power source Vin.

The second capacitors C2_1~C2_n, the rectifying switches $102_{13}$ 1~102_n, and the output capacitors Co_1~Co_n are arranged at the output stage. One terminal of each of the output capacitors Co_1~Co_n is electrically connected to one of the load RL_1~RL_n in parallel. Each of the second capacitors C2_1~C2_n is connected to one terminal of one of the windings W3_1~W3_n where the windings W4_1~W4_n are not connected, and the other terminal of each of the second capacitor C2_1~C2_n is connected to one of the output capacitor Co_1~Co_n. The rectifying switch 102_1~102_n are, for example, diodes; the cathode of each of the rectifying switch 102_1~102_n is connected to a node between the windings W3_1~W3_n and W4_1~W4_n electrically connected in series, and the anode thereof is connected to one of the second capacitors C2_1~C2_n and one of the loads RL_1~RL_n.

The output stage of the step up/down DC converter 10 shown in FIG. 8 is the same as that of shown in FIG. 2 mentioned above and are not repeated here for brevity, and the step up/down DC converter 10 shown in the FIG. 8 can achieve the functions as the step up/down DC converter 10 shown in the FIG. 2 mentioned above does.

Figure 9:
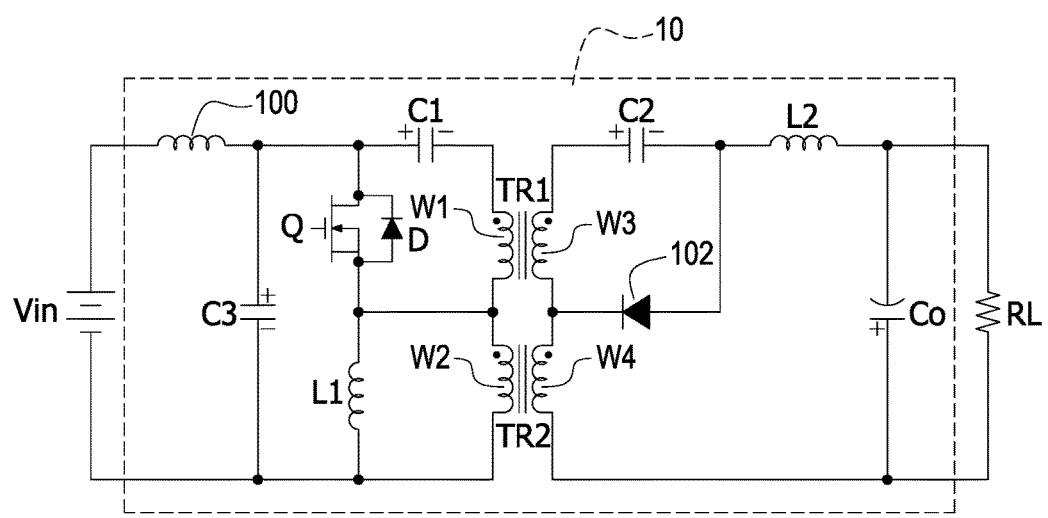
FIG. 9 is a circuit diagram of a step up/down DC converter according to a 6th embodiment of the present disclosure.

Reference is made to FIG. 9, which is a circuit diagram of a step up/down DC converter according to a 6th embodiment of the present disclosure. The step up/down DC converter 10 shown in FIG. 9 is similar to that of shown in FIG. 2 mentioned above, and the same reference numbers are used in the drawings and the description to refer to the same parts. It should be noted that step up/down DC power converter 10 shown in FIG. 9 further includes a second inductor L2 and a third capacitor C3.

The third capacitor C3 is arranged at the input stage of step up/down DC converter 10; one terminal of the third capacitor C3 is connected to the ripple-filtering inductor 100, the drain of the power switch Q, and the terminal of the first capacitor C1 where the first winding W1 is not connected, and the other terminal of the third capacitor C3 is connected to the negative terminal of the power source Vin, the terminal of the second winding W2 where the first winding W1 is not connected, and the terminal of the first inductor L1 wherein the power switch Q is not connected. The third capacitor C3 is configured to smooth the ripple voltage of the step up/down DC converter 10.

The second inductor L2 is arranged at the output stage; one terminal of the second inductor L2 is connected to the terminal of the second capacitor C2 where the third winding W3 is not connected and anode of the rectifying switch 102, and the other terminal of the second inductor L2 is connected to the output capacitor Co and the load RL. The second inductor L2 is configured to further smooth the ripple voltage of the step up/down DC converter 10. The step up/down DC converter 10 shown in the FIG. 7 can achieve the functions as the step up/down DC converter 10 shown in FIG. 2 mentioned above does and is not repeated here for brevity.

Figure 10:
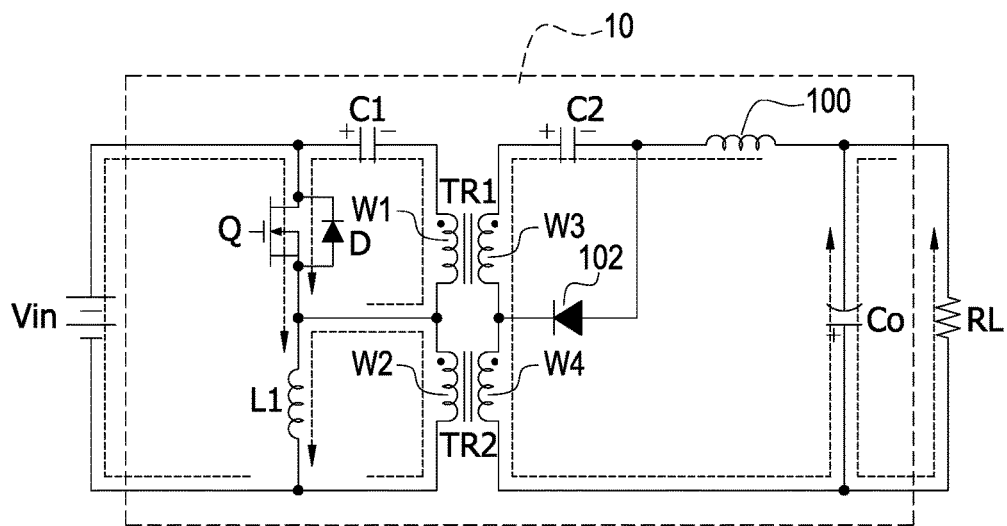
FIG. 10 is an equivalent diagram of the step up/down DC converter under a first operation mode according to the 7th embodiment of the present disclosure.

Reference is made to FIG. 10, which is a circuit diagram of a step up/down DC converter according to a 7th embodiment of the present disclosure. In FIG. 10, the step up/down DC converter 10 is arranged between a power source Vin and a load RL and electrically connected thereto for regulating an electric power supplied from the power source Vin to the load RL. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The step up/down DC converter 10 further includes an input stage electrically connected to the power source Vin and an output stage electrically connected to the load RL. The power isolating and converting unit includes a plurality of windings. For example, the power isolating and converting unit shown in FIG. 10 includes a first winding W1, a second winding W2, a third winding W3, and a fourth winding W4. The first winding W1 and the second winding W2 are arranged at the input stage and electrically connected in series, and the third winding W3 and the fourth winding W4 are arranged at the output stage and electrically connected in series. The first winding W1 is magnetically coupled with the third winding W3, thus a first transformer TR1 is constituted; the second winding W2 is magnetically coupled with the fourth winding W4, thus a second transformer TR2 is constituted.

The power switch Q, the first capacitor C1, and the first inductor L1 are arranged at the input stage. The power switch Q is, for example, a MOSFET; the drain of the power switch Q is connected to the positive terminal of the power source Vin, the source thereof is connected to a node between the first winding W1 and the second winding W2, and the gate thereof is connected to a controller (not shown) for receiving signals generates by the controller; the controller is configured to generate the signals to turn on/off the power switch Q. The step up/down DC converter 10 may further includes a diode D electrically connected to the power switch Q. Specifically, the cathode of the diode D is connected to the drain of the power switch Q and the anode thereof is connected to the source of the power switch Q; the diode D is, for example, the body diode of the power switch Q.

In FIG. 10, one terminal of the first capacitor C1 is connected to the positive terminal of the power source Vin and the drain of the power switch Q, and the other terminal of the first capacitor C1 is connected to the first winding W1 where the second winding W2 is not connected. One terminal of the first inductor L1 is connected to the source of the power switch Q, and the other terminal of the first inductor L1 is connected to the second winding W2 where the first winding W1 is not connected and the negative terminal of the power source Vin.

The second capacitor C2, the ripple-filtering inductor 100, the rectifying switch 102, and the output capacitor Co are arranged at the output stage. The rectifying switch 102 is, for example, a diode. The output capacitor Co is electrically connected to the load RL in parallel. One terminal of the second capacitor C2 is connected to the third winding W3 where the fourth winding W4 is not connected, and the other terminal of the second capacitor C2 is connected to the anode of the rectifying switch 102 and one terminal of the ripple-filtering inductor 100; the other terminal of the ripple-filtering inductor 100 is connected to the output capacitor Co and the load RL where the fourth winding W4 is not connected.

Figure 12:
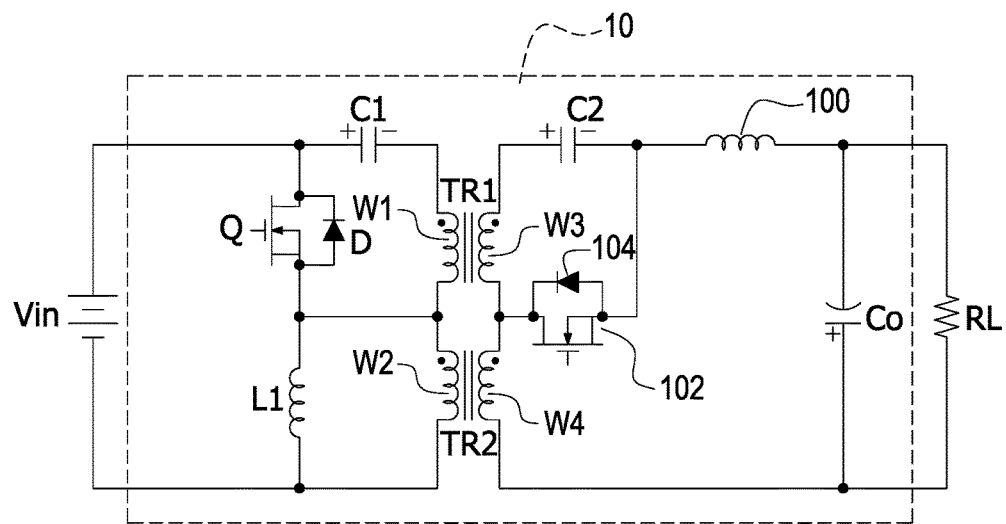
FIG. 12 is a circuit diagram of a step up/down DC converter according to an 8th embodiment of the present disclosure.

The step-down DC converter shown in FIG. 10 employs diodes for the rectification. Obviously, the positive conducting voltage-drop of the diodes becomes a main reason to restrict the increase of the efficiency. To solve the aforementioned problem, a general solution is to replace the diodes by MOSFETs for the rectification (as can be seen in FIG. 12). While the implementation of the step up/down DC converter 10 employs MOSFETs for the rectification is both complex and expensive, advantageously, the conduction loss can be reduced since the MOSFETs have advantages of low input resistance, short response time, and high input resistance.

In FIG. 12, the rectifying switch 102 is an N-type MOSFET; the drain of the rectifying switch 102 is connected to a node between the third winding W3 and the fourth winding W4, the source thereof is connected to the second capacitor C2 and the ripple-filtering inductor 100, and the gate thereof is connected to a controller (not shown) for receiving signals generates by the controller; the controller is configured to generate the signals to turn on/off the rectifying switch 102. The step up/down DC converter 10 may still further includes a diode 104 electrically connected to the rectifying switch 102. Specifically, the cathode of the diode 104 is connected to the drain of the rectifying switch 102, and the anode thereof is connected to the source of the rectifying switch 102; the diode 104 is, for example, the body diode of the rectifying switch 102. It should be noted that the step up/down DC converter 10 shown in the FIG. 12 can achieve the functions as the step up/down DC converter 10 shown in FIG. 10 mentioned above does.

In FIG. 10, when the step-down DC converter 10 is under a first operation mode, the power switch Q is conducted, the rectifying switch 102 turns off, this gives the electric power supplied from the power source Vin to be divided into three power flow paths at the input stage. One of the power flow paths is established in the power source Vin, the power switch Q, and the first inductor L1, another power flow path is established in the first winding W1, the first capacitor C1, and the power switch Q, and the other power flow path is established in the second winding W2 and the first inductor L1. Therefore, the electric power supplied from the power source Vin is conducted to the first winding W1 and the second winding W2, and can be magnetically coupled to the third winding W3 and the fourth winding W4.

The electric power magnetically coupled to the output stage establishes single power flow path in the second capacitor C2, the third winding W3, the fourth winding W4, and the output capacitor Co. The output capacitor Co provides electric power to the load RL.

Figure 11:
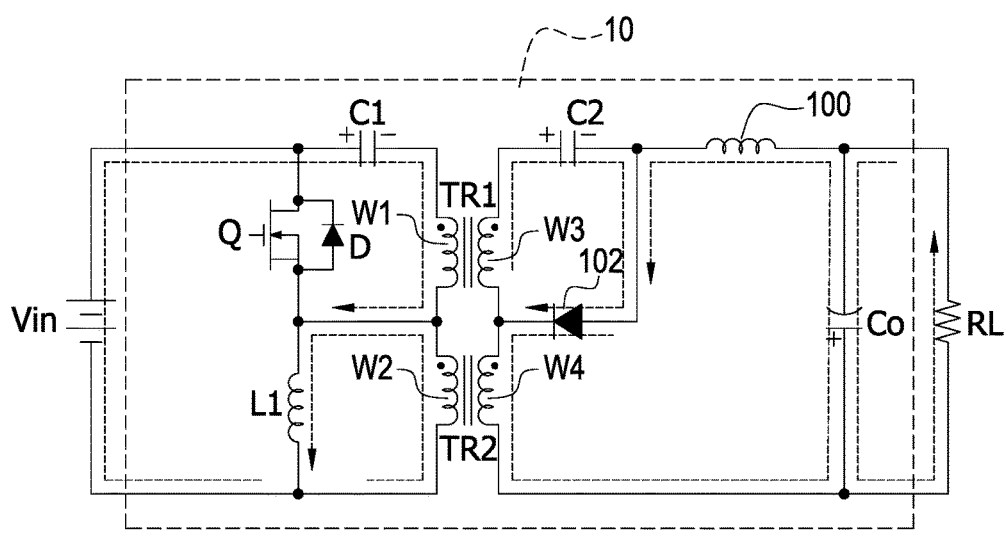
FIG. 11 is an equivalent diagram of the step up/down DC converter under a second operation mode according to the 7th embodiment of the present disclosure.

Reference is made to FIG. 11, which is an equivalent diagram of the step up/down DC converter under a second operation mode according to the 7th embodiment of the present disclosure. When the step up/down DC converter 10 is under a second operation mode, the power switch Q is not conducted and the rectifying switch 102 turns on, this gives the electric power supplied from the power source Vin to be divided into two power flow paths at the input stage. One of the power flow paths is established in the power source Vin, the first capacitor C1, the first winding W1, and the first inductor L1, and the other power flow path is established in the second winding W2 and the first inductor L1. Therefore, the electric power supplied from the power source Vin is conducted to the first winding W1 and the second winding W2, and can be magnetically coupled to the third winding W3 and the fourth winding W4.

The electric power coupled to the output stage is also divided into two power flow paths. One of the power flow paths is established in the third winding W3, the second capacitor C2, and the rectifying switch 102, and the other power flow path is established in the ripple-filtering inductor 100, rectifying switch 102, the fourth winding W4, and the output capacitor Co. The output capacitor Co provides electric power to the load RL.

Figure 13:
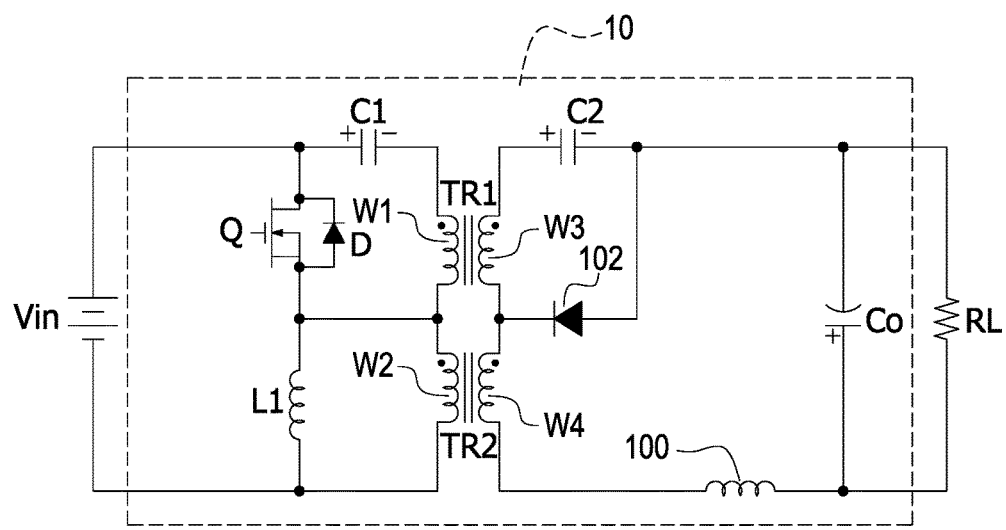
FIG. 13 is a circuit diagram of a step up/down DC converter according to a 9th embodiment of the present disclosure.

Reference is made to FIG. 13, which is a circuit diagram of a step up/down DC converter according to a 9th embodiment of the present disclosure. The input stage of the step up/down DC converter 10 shown in FIG. 13 is the same as that of shown in FIG. 10 mentioned above, and the same reference numbers are used in the drawings and the description to refer to the same parts. It should be noted that the ripple-filtering inductor 100 at the output stage of the step up/down DC converter 10 shown in FIG. 13 is connected to the fourth winding W4 where the third winding W3 is not connected and the output capacitor Co.

The step up/down DC converter 10 shown in the FIG. 13 can achieve the functions as the step up/down DC converter 10 shown in FIG. 10 and FIG. 11 mentioned above does and is not repeated here for brevity.

Figure 14:
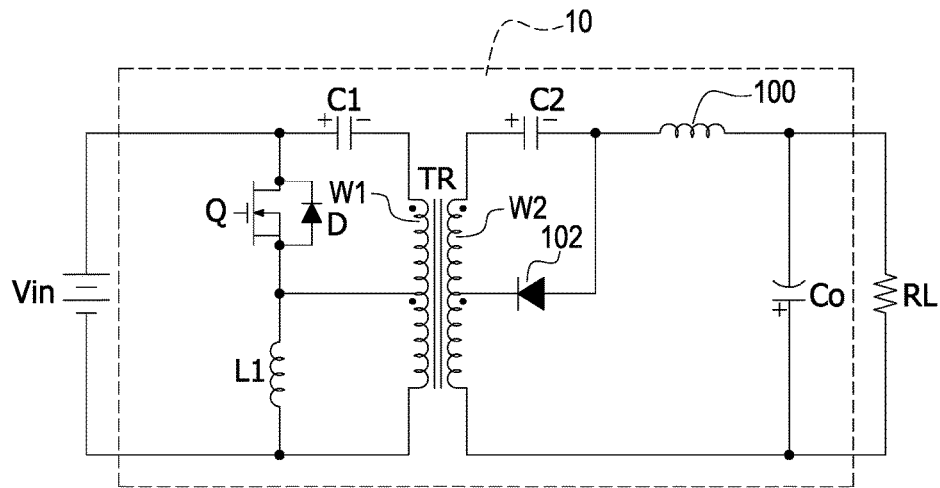
FIG. 14 is a circuit diagram of a step up/down DC converter according to a 10th embodiment of the present disclosure.

Reference is made to FIG. 14, which is a 10th embodiment of a step up/down DC converter according to the present disclosure. In FIG. 14, the step up/down DC converter 10 is arranged between a power source Vin and a load RL and electrically connected thereto for regulating an electric power supplied from the power source Vin to the load RL. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The power isolating and converting unit includes a plurality of windings. For example, the power isolating and converting unit shown in FIG. 14 includes a first winding W1 and a second winding W2; the first winding W1 is arranged at an input stage of the step up/down DC converter 10 and electrically connected to the power source Vin, and the second winding W2 is arranged at an output stage of the step up/down DC converter 10 and electrically connected to the load RL. In addition, the first winding W1 is magnetically coupled with the second winding W2, thus a center-tapped transformer TR is constituted.

The power switch Q, the first capacitor C1, and the first inductor L1 are arranged at the input stage. The power switch Q is, for example, a MOSFET. The upper tap of the first winding W1 is connected to the first capacitor C1, the lower tap of the first winding W1 is connected to the negative terminal of the power source Vin, and the center tap of the first winding W1 is connected to the source of the power switch Q.

The drain of the power switch Q is connected to the terminal of the first capacitor C1 where the first winding W1 is not connected, and the gate thereof is connected to a controller (not shown) for receiving signals generates by the controller; the controller is configured to generate the signals to turn on/off the power switch Q. One terminal of the first inductor L1 is connected to the center tap of the first winding W1, and the other terminal of the first inductor L1 is connected to the lower tap of the first winding W1 and the negative terminal of the power source Vin.

The second capacitor C2, the rectifying switch 102, the ripple-filtering inductor 100, and the output capacitor Co are arranged at the output terminal. The output capacitor Co is electrically connected to the load RL in parallel. The upper tap of the second winding W2 is connected to the second capacitor C2, the lower tap thereof is connected to the output capacitor Co and the load RL, and the center tap thereof is connected to the cathode of the rectifying switch 102; the anode of the rectifying switch 102 is connected to the second capacitor C2 where the upper tap of the second winding W2 is not connected. One terminal of the ripple-filtering inductor 100 is connected to the second capacitor C2 where the upper tap of the second winding W2 is not connected, and the other terminal of the ripple-filtering inductor 100 is connected to the output capacitor Co and the load RL where the lower tap of the second winding W2 is not connected.

The step up/down DC converter 10 shown in the FIG. 14 can achieve the functions as the step up/down DC converter 10 shown in FIG. 10 and FIG. 11 mentioned above does and is not repeated here for brevity.

Figure 15:
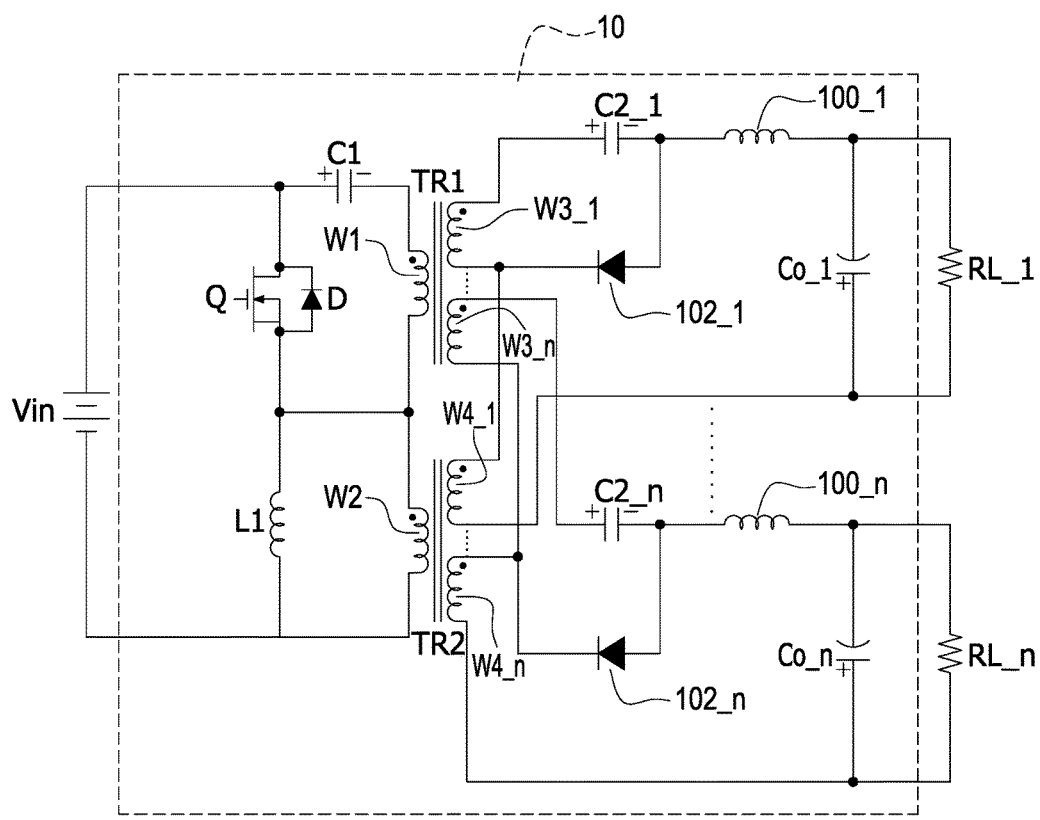
FIG. 15 is a circuit diagram of a step up/down DC converter according to an 11th embodiment of the present disclosure.

Reference is made to FIG. 15, which is an 11th embodiment of a step up/down DC converter according to the present disclosure. The input stage of the step up/down DC converter 10 shown in FIG. 15 is the same as that of shown in FIG. 10 mentioned above, and the same reference numbers are used in the drawings and the description to refer to the same parts. It should be noted that the scheme for the output stage of the step up/down DC converter 10 shown in FIG. 15 is constituted by a plurality of circuitries of output stages shown in FIG. 10 mentioned above, and the step up/down DC converter 10 shown in FIG. 15 is configured to regulate an electric power supplied from a power source Vin to a plurality of loads RL_1~RL_n.

In FIG. 15, the step up/down DC converter 10 is arranged between the power source Vin and the loads RL_1~RL_n and electrically connected thereto. The step up/down DC converter 10 includes a power isolating and converting unit (its reference numeral is omitted), a power switch Q, a first inductors L1, a first capacitor C1, a plurality of second capacitors C2_1~C2_n, a plurality of ripple-filtering inductors 100_1~100_n, a plurality of rectifying switches 102_1~102_n, and a plurality of output capacitors Co_1~Co_n.

The step up/down DC converter 10 further includes an input stage electrically connected to the power source Vin and an output stage electrically connected to the load RL_1~RL_n. The power isolating and converting unit includes a plurality of windings. In FIG. 15, windings W1 and W2 electrically connected in series are arranged at the input stage, and windings W3_1~W3_n and W4_1~W4_n are arranged at the output stage. Each of the windings W3_1~W3_n is electrically connected to one of the windings W4_1~W4_n in series. For example, the windings W3_1 and W4_1 are electrically connected in series, and the windings W3_1~W3_n and W4_1~W4_n are electrically connected in series. The winding W1 is magnetically coupled with the windings W3_1~W3_n thus a first transformer TR1 is constituted; the winding W2 is magnetically coupled with the windings W4_1~W4_n thus a second transformer TR2 is constituted.

The power switch Q, the first capacitor C1, and the first inductor L1 are arranged at the input stage. The power switch Q is, for example, a MOSFET. One terminal of the first capacitor C1 is connected to the first winding W1 where the second winding W2 is not connected, and the other terminal of the first capacitor C1 is connected to the positive terminal of the power source Vin and the drain of the power switch Q. The source of the power switch Q is connected to a node between the winding W1 and W2, and the gate thereof is connected to a controller (not shown) for receiving signals generates by the controller; the controller is configured to generate the signals to turn on/off the power switch Q. One terminal of the first inductor L1 is connected to the source of the power switch Q, and the other terminal of the first inductor L1 is connected to the winding W2 where the winding W1 is not connected and the negative terminal of the power source Vin.

The second capacitors C2_1~C2_n, the ripple-filtering inductor 100_1~100_n, the rectifying switches 102_1~102_n, and the output capacitors Co_1~Co_n are arranged at the output stage. Each of the output capacitors Co_1~Co_n is electrically connected to one of the load RL_1~RL_n in parallel. One terminal of each of the second capacitors C2_1~C2_nis electrically connected to one terminal of one of the windings W3_1~W3_n where the windings W4_1~W4_n are not connected, and the other terminal of each of the second capacitor C2_1~C2_n is connected to one of the output capacitor Co_1~Co_n through one of the ripple-filtering inductor 100_1~100_n. The rectifying switch 102_1~102_n are, for example, diodes; the cathode of each of the rectifying switch 102_1~102_n is connected to a node between the windings W3_1~W3_n and W4_1~W4_n n electrically connected in series, and the anode thereof is connected to one of the second capacitors C2_1~C2_n and one of the loads RL_1~RL_n.

The output stage of the step up/down DC converter 10 shown in FIG. 15 is the same as that of shown in FIG. 10 mentioned above and are not repeated here for brevity, and the step up/down DC converter 10 shown in the FIG. 15 can achieve the functions as the step up/down DC converter 10 shown in the FIG. 10 and FIG. 11 mentioned above does.

Figure 16:
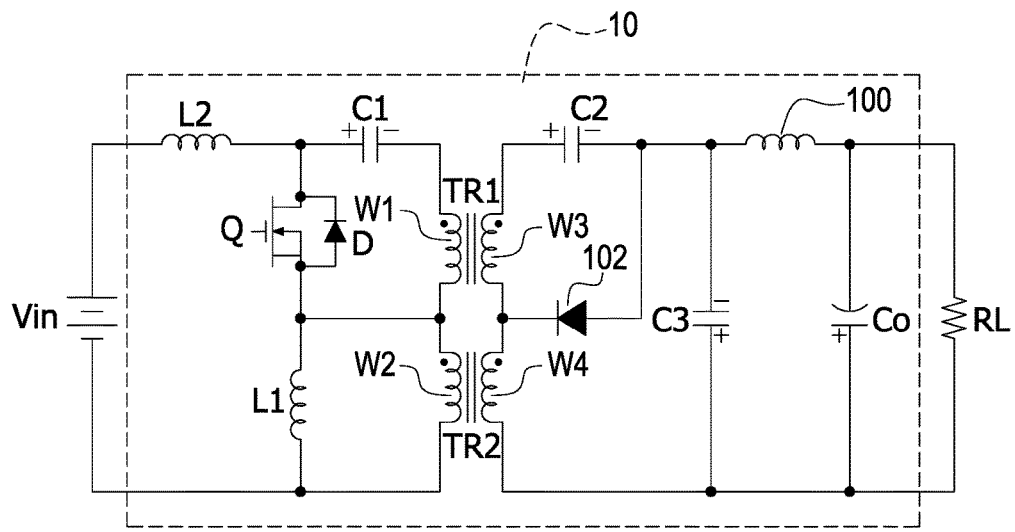
FIG. 16 is a circuit diagram of a step up/down DC converter according to a 12th embodiment of the present disclosure.

Reference is made to FIG. 16, which is a 12th embodiment of a step up/down DC converter according to the present disclosure. The step up/down DC converter 10 shown in FIG. 16 is similar to that of shown in FIG. 10 mentioned above, and the same reference numbers are used in the drawings and the description to refer to the same parts. It should be noted that step up/down DC power converter 10 shown in FIG. 16 further includes a second inductor L2 and a third capacitor C3.

The second inductor L2 is arranged at the input stage; one terminal of the second inductor L2 is connected to the positive terminal of the power source Vin, and the other terminal thereof is connected to the drain of the power switch Q and one terminal of the first capacitor C1 where the first winding W1 is not connected. The second inductor L2 is applied to smooth the ripple voltage of the step up/down DC converter.

The third capacitor C3 is arranged at the output stage; one terminal of the third capacitor C3 is connected to the second capacitor C2 where the third winding W3 is not connected, one terminal of the ripple-filtering inductor 100 where the output capacitor Co and the load RL is connected, and the anode of the rectifying switch 102, and the other terminal of the third capacitor C3 is connected to the fourth winding W4 where the third winding W3 is connected, and the output capacitor Co (and the load RL) where the ripple-filtering inductor 100 is connected. The third capacitor C3 is applied to further smooth the ripple voltage of the step up/down DC converter 10. The step up/down DC converter 10 shown in the FIG. 16 can achieve the functions as the step up/down DC converter 10 shown in FIG. 10 and FIG. 11 mentioned above does and is not repeated here for brevity.

Figure 17:
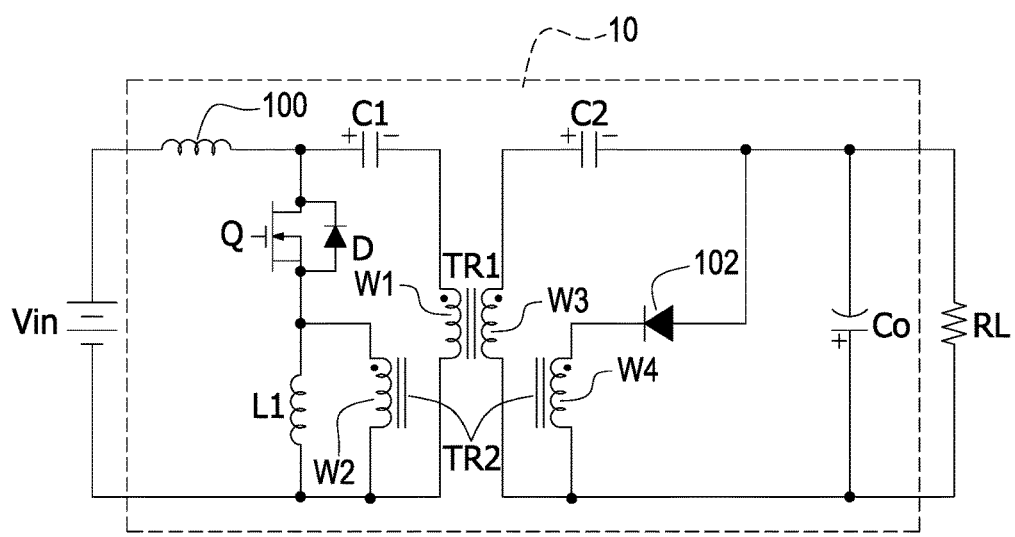
FIG. 17 is a circuit diagram of a step up/down DC converter according to a 13th embodiment of the present disclosure.

Reference is made to FIG. 17, which is a 13th embodiment of a step up/down DC converter according to the present disclosure. In FIG. 17, the step up/down DC converter 10 is arranged between a power source Vin and a load RL and electrically connected thereto for regulating an electric power supplied from the power source Vin to the load RL. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The step up/down DC converter 10 further includes an input stage electrically connected to the power source Vin and an output stage electrically connected to the load RL. The power isolating and converting unit includes a plurality of windings. For example, the power isolating and converting unit shown in FIG. 17 includes a first winding W1, a second winding W2, a third winding W3, and a fourth winding W4. The first winding W1 and the second winding W2 are arranged at the input stage, and the third winding W3 and the fourth winding W4 are arranged at the output stage. The first winding W1 is magnetically coupled with the third winding W3, thus a first transformer TR1 is constituted; the second winding W2 is magnetically coupled with the fourth winding W4, thus a second transformer TR2 is constituted.

The power switch Q is, for example, a MOSFET. One terminal of the first winding W1 is connected to the first capacitor C1, and the other terminal of the first winding W1 is connected to the negative terminal of the power source Vin. One terminal of the ripple-filtering inductor 100 is connected to the positive terminal of the power source Vin, and the other terminal of the ripple-filtering inductor 100 is connected to the drain of the power switch Q and the terminal of the first capacitor where the first winding W1 is not connected.

One terminal of the second winding W2 is connected to the source of the power switch Q, and the other terminal of the second winding W2 is connected to the negative terminal of the power source Vin. The first inductor L1 is electrically connected to the second winding W2 in parallel. The gate of the power switch Q is connected to a controller (not shown) for receiving signals generates by the controller; the controller is configured to generate the signals to turn on/off the power switch Q. The step up/down DC converter 10 may further includes a diode D electrically connected to the power switch Q. Specifically, the cathode of the diode D is connected to the drain of the power switch Q and the anode thereof is connected to the source of the power switch Q; the diode D is, for example, the body diode of the power switch Q.

The second capacitor C2, the rectifying switch 102, and the output capacitor Co are arranged at the output stage. The output capacitor Co is electrically connected to the load RL in parallel. The rectifying switch 102 is, for example, a diode. One terminal of the third winding W3 is connected to the second capacitor C2, and the other terminal of the third winding W3 is connected to the output capacitor Co and the load RL. One terminal of the fourth winding W4 is connected to the cathode of the rectifying switch 102, and the other terminal of the fourth winding W4 is connected to the terminal of the third winding W3 where the output capacitor Co and the load RL are connected. The terminal of the second capacitor C2 where the third winding W3 is not connected is connected to the anode of the rectifying switch 102, and the terminals of the output capacitor Co and the load RL where the third winding W3 and the fourth winding W4 are connected is connected to the anode of the rectifying switch 102.

Besides, the non-dot terminal of the first winding W1 is connected to the non-dot terminal of the second winding W2, and the non-dot terminal of the third winding W3 is connected to the non-dot terminal of the fourth winding W4, thus the switching loss of the power switch Q can be effectively reduced.

Figure 18:
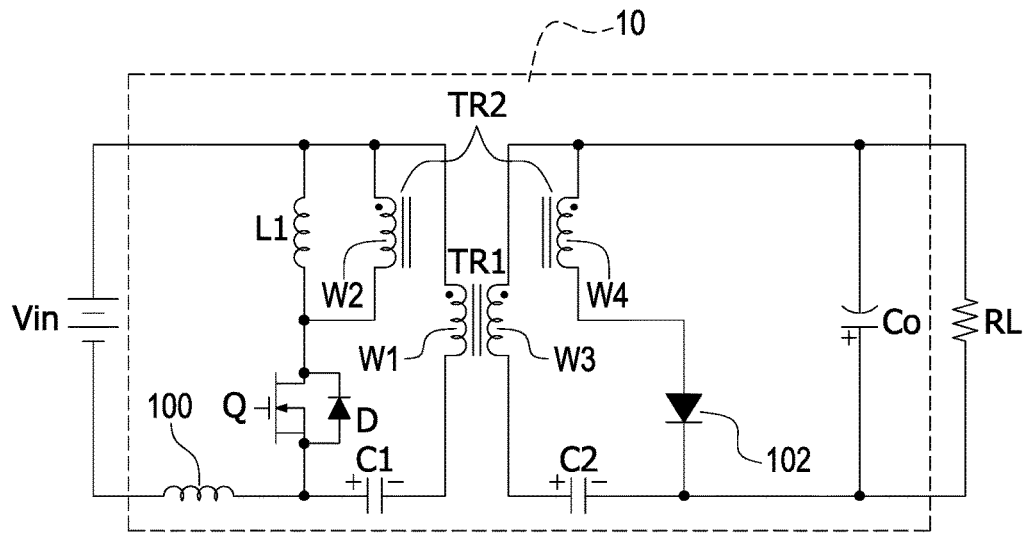
FIG. 18 is a circuit diagram of a step up/down DC converter according to a 14th embodiment of the present disclosure.

Reference is made to FIG. 18, which is a 14th embodiment of a step up/down DC converter according to the present disclosure. In FIG. 18, the step up/down DC converter 10 is arranged between a power source Vin and a load RL and electrically connected thereto for regulating an electric power supplied from the power source Vin to the load RL. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The step up/down DC converter 10 further includes an input stage electrically connected to the power source Vin and an output stage electrically connected to the load RL. The power isolating and converting unit includes a plurality of windings. For example, the power isolating and converting unit shown in FIG. 18 includes a first winding W1, a second winding W2, a third winding W3, and a fourth winding W4. The first winding W1 and the second winding W2 are arranged at the input stage, and the third winding W3 and the fourth winding W4 are arranged at the output stage. The first winding W1 is magnetically coupled with the third winding W3, thus a first transformer TR1 is constituted; the second winding W2 is magnetically coupled with the fourth winding W4, thus a second transformer TR2 is constituted.

The ripple-filtering inductor 100, the power switch Q, the first capacitor C1, and the first inductor L1 are arranged at the input stage. The power switch Q is, for example, a MOSFET. One terminal of the first winding W1 is connected to the positive terminal of the power source Vin, and the other terminal of the first winding W1 is connected to one terminal of the first capacitor C1; the other terminal of the first capacitor C1 is connected to the source of the power switch Q. One terminal of the second winding W2 is connected to the positive terminal of the power source Vin, and the other terminal of the second winding W2 is connected to the drain of the power switch Q. The first indictor L1 is electrically connected to the second winding W2 in parallel. One terminal of the ripple-filtering inductor 100 is connected to the negative terminal of the power source Vin, and the other terminal of the ripple-filtering inductor 100 is connected to the source of the power switch Q. The gate of the power switch Q is connected to a controller (not shown) for receiving signals generates by the controller; the controller is configured to generate the signals to turn on/off the power switch Q.

The step up/down DC converter 10 further includes a diode D electrically connected to the power switch Q. Specifically, the cathode of the diode D is connected to the drain of the power switch Q and the anode thereof is connected to the source of the power switch Q; the diode D is, for example, the body diode of the power switch Q.

The rectifying switch 102, the second capacitor C2, and the output capacitor Co are arranged at the output stage. The rectifying switch 102 is, for example, a diode. One terminal of the third winding W3 is connected to the fourth winding W4, the output capacitor Co, and the load RL, and the other terminal of the third winding W3 is connected to one terminal of the second capacitor C2; the other terminal of the second capacitor C2 is connected to the cathode of the rectifying switch 102 and the terminals of the output capacitor Co and the load RL where the third winding W3 is not connected. The anode of the rectifying switch 102 is connected to the terminal of the fourth winding W4 where the third winding W3 is not connected.

Besides, the non-dot terminal of the first winding W1 is connected to the non-dot terminal of the second winding W2, and the non-dot terminal of the third winding W3 is connected to the non-dot terminal of the fourth winding W4, thus the switching loss of the power switch Q can be effectively reduced.

Figure 19:
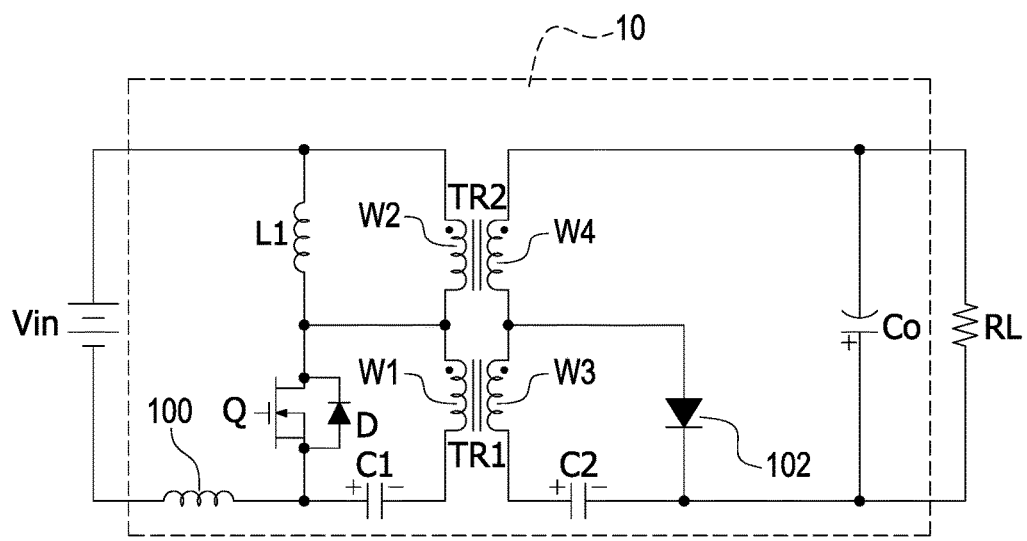
FIG. 19 is a circuit diagram of a step up/down DC converter according to a 15th embodiment of the present disclosure.

Reference is made to FIG. 19, which is a 15th embodiment of a step up/down DC converter according to the present disclosure. In FIG. 19, the step up/down DC converter 10 is arranged between a power source Vin and a load RL and electrically connected thereto for regulating an electric power supplied from the power source Vin to the load RL. The step up/down DC converter 10 includes a power isolating and converting unit (its reference numeral is omitted), a ripple-filtering inductor 100, a power switch Q, a first inductor L1, a rectifying switch 102, a first capacitor C1, a second capacitor C2, and an output capacitor Co.

The step up/down DC converter 10 further includes an input stage electrically connected to the power source Vin and an output stage electrically connected to the load RL. The power isolating and converting unit includes a plurality of windings. For example, the power isolating and converting unit includes a first winding W1, a second winding W2, a third winding W3, and a fourth winding W4. The first winding W1 and the second winding W2 electrically connected in series are arranged at the input stage, and the third winding W3 and the fourth winding W4 electrically connected in series are arranged at the output stage. The first winding W1 is magnetically coupled with the third winding W3, thus a first transformer TR1 is constituted; the third winding W3 is magnetically coupled with the fourth winding W4, thus a second transformer TR2 is constituted.

The ripple-filtering inductor 100, the power switch Q, the first capacitor C1, and the first inductor L1 are arranged at the input terminal. The power switch Q is, for example, a MOSFET. One terminal of the first winding W1 is connected to the second winding W2 and the drain of the power switch Q, and the other terminal of the first winding W1 is connected to one terminal the first capacitor C1; the other terminal of the first capacitor C1 is connected to the source of the power switch Q. The terminal of the second winding W2 where the first winding W1 is not connected is connected to the positive terminal of the power source Vin; the first inductor L1 is electrically connected to the second winding W2 in parallel (i.e., one terminal of the first inductor L1 is connected to the positive terminal of the power source Vin, and the other terminal of the first inductor L1 is connected to the drain of the power switch Q). One terminal of the ripple-filtering inductor 100 is connected to the negative terminal of the power source Vin, and the other terminal of the ripple-filtering inductor 100 is connected to the source of the power switch Q and the terminal of the first capacitor C1 where the first winding W1 is not connected.

The rectifying switch 102, the second capacitor C2, and the output capacitor Co are arranged at the output stage. The rectifying switch 102 is, for example, a diode. The terminal of the third winding W3 where the fourth winding W4 is not connected is connected to one terminal of the second capacitor C2, and the other terminal of the second capacitor C2 is connected to the cathode of the rectifying switch 102, the output capacitor Co, and the load RL. The terminal of the fourth winding W4 connected to the third winding W3 is further connected to the anode of the rectifying switch, and the other terminal of the fourth winding W4 is connected to the output capacitor Co and the load RL where the second capacitor C2 is not connected.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A step up/down direct current (DC) converter arranged between a power source and a load and electrically connected to the power source and the load, the step up/down DC converter comprising:
   a ripple-filtering inductor;
   a power isolating and converting unit electrically connected to the ripple-filtering inductor, wherein the power isolating and converting unit comprises a plurality of windings for isolation an input stage electrically connected to the power source from an output stage electrically connected to the load;
   a power switch arranged at the input stage and electrically connected to the power isolating and converter unit;
   a first inductor arranged at the input stage and electrically connected to the power isolating and converting unit and the power switch;
   a first capacitor arranged at the input stage and electrically connected to the power isolating and converting unit and the power switch;
   a second capacitor arranged at the output stage and electrically connected to the power isolating unit;
   a rectifying switch arranged at the output stage and electrically connected to the power isolating and converting unit and the second capacitor; and
   an output capacitor arranged at the output stage and electrically connected to the power isolating and converting unit, the second capacitor, the rectifying switch, and the load,
   wherein the rectifying switch turns off when the power is conducted, thus the ripple-filtering inductor and the first inductor divide the electric power to smooth a ripple voltage conducted to the load; and
   the rectifying switch turns on when the power switch is conducted, thus the ripple-filtering inductor and the first capacitor divide the electric power to smooth the ripple voltage conducted to the load.

2. The step-up/down DC converter of claim 1, wherein the windings collectively constitute two transformers.

3. The step-up/down DC converter of claim 1, wherein the windings collectively constitute a center-tapped transformer.

4. The step-up/down DC converter of claim 1, wherein the ripple-filtering inductor is arranged at the input stage and electrically connected to the power source, the power switch, and the first capacitor.

5. The step-up/down DC converter of claim 4, wherein the windings collectively constitute two transformers.

6. The step-up/down DC converter of claim 4, wherein the winding collectively constitute a center-tapped transformer.

7. The step-up/down DC converter of claim 4, further comprising:
   a second inductor arranged at the output stage, wherein one terminal of the second inductor is electrically connected to the second capacitor and the rectifying switch, and the other terminal of the second inductor is electrically connected to the load; and
   a third capacitor arranged at the input stage, wherein one terminal of the third capacitor is electrically connected to the ripple-filtering inductor, the first capacitor and the power switch, and the other terminal of the third capacitor is electrically connected to the power source and the power isolating and converting unit.

8. The step-up/down DC converter of claim 7, wherein the windings collectively constitute two transformers.

9. The step-up/down DC converter of claim 7, wherein the windings collectively constitute a center-tapped transformer.

10. The step-up/down DC converter of claim 1, wherein the ripple-filtering inductor is arranged at the input stage and electrically connected to the power source and the first inductor.

11. The step-up/down DC converter of claim 10, wherein the windings collectively constitute two transformers.

12. The step-up/down DC converter of claim 10, wherein the windings collectively constitute a center-tapped transformer.

13. The step-up/down DC converter of claim 1, wherein the ripple-filtering inductor is arranged at the output stage and electrically connected to the second capacitor, the rectifying switch, and the output capacitor.

14. The step-up/down DC converter of claim 13, wherein the windings collectively constitute two transformers.

15. The step-up/down DC converter of claim 13, wherein the windings collectively constitute a center-tapped transformer.

16. The step-up/down DC converter of claim 13, further comprising:
   a second inductor arranged at the input stage, wherein one terminal of the second inductor is electrically connected to the power source, and the other terminal of the second inductor is electrically connected to the power switch and the first capacitor; and
   a third capacitor arranged at the output stage, wherein one terminal of the third capacitor is electrically connected to the rectifying switch, the second capacitor, and the ripple-filtering inductor, and the other terminal of the third capacitor is electrically connected to the power isolating and converting unit and the load.

17. The step-up/down DC converter of claim 16, wherein the windings collectively constitute two transformers.

18. The step-up/down DC converter of claim 16, wherein the windings collectively constitute a center-tapped transformer.

19. The step-up/down DC converter of claim 1, wherein the ripple-filtering inductor is arranged at the output stage and electrically connected to the power isolating and converting unit and the output capacitor.

20. The step-up/down DC converter of claim 1, wherein the rectifying switch is a diode or a metal-oxide-semiconductor field-effect transistor (MOSFET).

* * * * *